United States Patent [19]

Muehrcke

[11] Patent Number: 5,136,581
[45] Date of Patent: Aug. 4, 1992

[54] ARRANGEMENT FOR RESERVING AND ALLOCATING A PLURALITY OF COMPETING DEMANDS FOR AN ORDERED BUS COMMUNICATION NETWORK

[75] Inventor: Eric B. Muehrcke, Middletown, N.J.

[73] Assignee: AT&T Bell Laboratories, Murray Hill, N.J.

[21] Appl. No.: 546,954

[22] Filed: Jul. 2, 1990

[51] Int. Cl.$^5$ .................. H04Q 11/04; H04M 3/42
[52] U.S. Cl. ..................................... 370/62; 370/58.1; 370/85.2; 379/54; 379/202; 379/206
[58] Field of Search ............... 370/53, 54, 58.1, 58.2, 370/58.3, 85.1, 85.9, 85.13, 85.14, 62, 85.2; 379/27, 29, 88, 89, 90, 93, 94, 157, 158, 201, 202, 204, 205, 206, 53, 54; 358/85; 364/138, 148, 513, 550

[56] References Cited

U.S. PATENT DOCUMENTS

| | | | |
|---|---|---|---|
| 4,710,917 | 12/1987 | Tompkins et al. | 370/62 |
| 4,796,293 | 1/1989 | Blinken et al. | 379/202 |
| 4,937,856 | 6/1990 | Natarajan | 370/62 |

OTHER PUBLICATIONS

M. R. Garey et al., *Computers and Intractability-A Guide to the Theory of NP—Completeness*, New York: W. H. Freeman & Co. (1979) pp. 1-44 and 226.

DACS II (Digital Access and Cross-Connect System II)—Reference Manual, AT&T Technologies, Printed in U.S.A. (May 1987) pp. 1-1 to 5-8.

Digital Multipoint Bridge, AT&T Technical Description (undated) pp. 1 to 94.

Rembrandt Video System—User Manual (for T1, G703/732, RS-422/449 and V.11 Applications) San Jose, Calif. (Aug. 1985), pp. 2-1 to 2-19.

Dataphone® 11 740/741 Acculink™ Multiplexer—Reference Manual, Document No. 999-101-289IS, Issue No. 2, AT&T Printed in U.S.A., (1989), pp. 1-1 to IN-2.

*Primary Examiner*—Douglas W. Olms
*Assistant Examiner*—Alpus H. Hsu
*Attorney, Agent, or Firm*—B. H. Freedman

[57] ABSTRACT

A method and system for allocating a constrained common resource (such as capacity in an ordered bus network) among a plurality of demands for the resource. The allocation arrangement receives from a source, demands for allocating the resource (network) for a particular use, e.g., a conference among a plurality of customer sites, stratifies the received demands in response to a grouping of endpoints to be conferenced at the customer sites, and allocates the network resources to connect the endpoints to be conferenced in response to the stratified demand. This is done by generating setup and terminate times for each endpoint to be connected in a conference; reserving the endpoints to be connected in the conference; and generating a plurality of bindings for signalling the network and the source as to the success of connecting the endpoints to be conferenced over the ordered bus network. The arrangement also stratifies a customer's demand into sets of strategies for groupings of like endpoints; allocates network resources responsive to characteristics of the different groupings of like endpoints; for each strategy, generates the setup times and terminate times for each endpoint, reserves the endpoints for a reservation, and generates bindings. The endpoints may be codecs, alternate accesses, offnets, audio bridges, and/or video conference controllers.

28 Claims, 6 Drawing Sheets

FIG. 4

EXAMPLE 400

CUSTOMER DEMAND:

MINIMUM BANDWIDTH = 12/24 DSI OR 12 DSOs
SETUP_TIME-DATE = 1:00 pm 6/15/90
TERMINATE_TIME-DATE = 5:00 pm 6/15/90

ENDPOINT UNIT OF EQUIPMENT: MULTIPOINT AUDIO BRIDGE
AND VCC AND CODEC,
ALTERNATE ACCESS,
OR OFFNET

| CUSTOMER SITE | ENDPOINT AT CUSTOMER SITE | START TIME-DATE | STOP TIME-DATE |
|---|---|---|---|
| 110-1 | 280 | 2:00 pm 6/15/90 | 4:00 pm 6/15/90 |
| 110-2 | 200 | 1:00 pm 6/15/90 | 5:00 pm 6/15/90 |
| 110-3 | 200 | 1:00 pm 6/15/90 | 5:00 pm 6/15/90 |
| 110-4 | 200 | 1:00 pm 6/15/90 | 5:00 pm 6/15/90 |
| 110-5 | 200 | 1:00 pm 6/15/90 | 5:00 pm 6/15/90 |
| 110-6 | 220 | 1:00 pm 6/15/90 | 5:00 pm 6/15/90 |
| 110-7 | 200 | 1:00 pm 6/15/90 | 5:00 pm 6/15/90 |
| 110-8 | 200 | 2:00 pm 6/15/90 | 4:00 pm 6/15/90 | ptm
ARRANGEMENT FOR RESERVING AND ALLOCATING A PLURALITY OF COMPETING DEMANDS FOR AN ORDERED BUS COMMUNICATION NETWORK

BACKGROUND OF THE INVENTION

1. Field of the Invention

This invention relates to resource allocation and, more particularly, to allocating a constrained common resource among a plurality of demands for the resource.

2. Description of the Prior Art

The term "resource allocation" applies to that class of problems, which has as a common characteristic the need to physically allocate a restricted or constrained common resource among a plurality of demands for that resource. For example, in a communications system, it is common to allocate network resources such as trunks for video conferencing on a manual first come, first served basis. Obviously, it would be desirable to automate the allocation process.

Dynamic storage allocation problems are well known in the art. The term "dynamic storage allocation" applies to that class of problems, which relates to reserving contiguous space in some storage medium for some period of time in order to satisfy the demands a customer may have for the storage medium. Unfortunately, known dynamic storage allocations algorithms tend to be NP-complete, i.e. they are not generally solvable in reasonably short periods of time. More specifics can be found in any standard text such as the text by Michael R. Garey and David S. Johnson entitled "Computers and Intractability—A Guide to the Theory of NP-Completeness", New York: W. H. Freeman and Company (1979). In light of the above, it is common to settle on a solution which may represent a balance between the imperfect utilization of the resource and the time to find a recommended solution. Notwithstanding, known processes to find a recommended solution of the allocation of the constrained common resource to meet the plurality of demands still require excessive amounts of time and, therefore, a more timely solution remains needed in the art. Furthermore, flexibility is needed to better serve the almost unpredictable needs and demands of the customers, who want and need to use the common resource. Unfortunately, the common resources often suffers from maladies and constraints of its own, not the least of which may be that the common resource is unavailable.

SUMMARY OF THE INVENTION

These and other problems are solved in accord with the principles of my invention which includes a method and a system for allocating a constrained common resource among a plurality of demands for the resource. In response to a plurality of demands from a source, the network, which includes a plurality of customer sites, each customer site including one or more endpoints, each endpoint being connectable to a switching system, the switching system being connectable to another switching system, comprises means for connecting a first endpoint through one or more switching systems to a second endpoint. The allocation arrangement receives demands from a customer site for allocating the network for a communication among a plurality of customer sites and stratifies the received demands in response to a grouping of endpoints to be conferenced at the customer sites. It can then allocate the network resources to connect the endpoints to be conferenced in response to the stratified demand including generating setup and terminate times for each endpoint to be connected in a conference; reserving the endpoints to be connected in the conference; and generating a plurality of bindings for signalling the network and the source as to success of connecting the endpoints to be conferenced over an ordered bus network. The arrangement also stratifies a customer's demand into sets of strategies for groupings of like endpoints; allocates network resources responsive to characteristics of the different groupings of like endpoints; for each strategy, generates the setup_times and terminate_times for each endpoint and reserves the endpoints for a reservation and generates bindings. The arrangement also, for a first grouping of like endpoints such as codecs, alternate accesses, and offnets, extends a conference signal through a multiplexer or concentrator at a customer site over an access line to a homing DACS; while, for a second grouping of like endpoints such as audio bridges, extends a conference signal from a customer site to a central bridging DACS; while, for a third grouping of like endpoints such as VCCs, extends a conference signal from a customer site to the network; means for generating a DMB sequence number for the reservation.

These and other problems are solved in accord with the principles of my invention which includes a method and apparatus for allocating a constrained common resource among a plurality of demands for the resource.

BRIEF DESCRIPTION OF THE DRAWINGS

My invention should become more apparent from the following detailed description when taken in conjunction with the accompanying drawing in which:

FIG. 4 illustrates a second set of customer demands, which need to be allocated to satisfy the needs of a customer and which is helpful in understanding a second example that is also useful in explaining the principles of the present invention.

DETAILED DESCRIPTION

Figure 1:
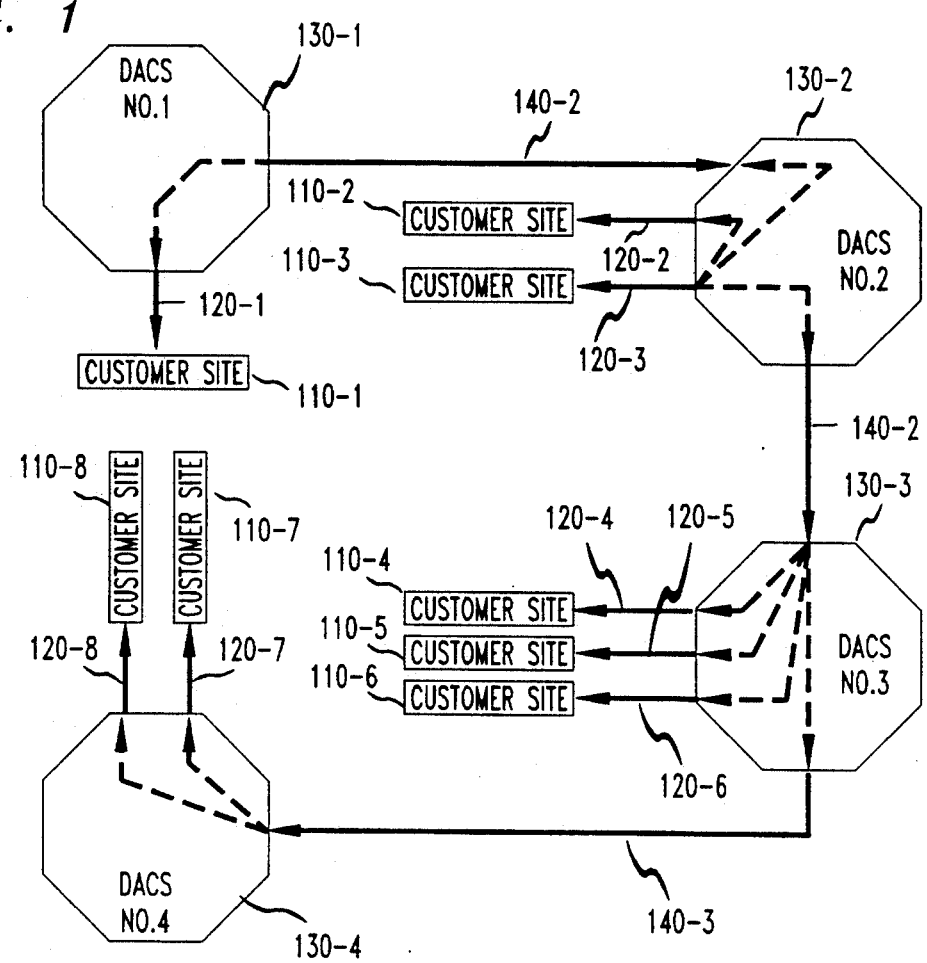
FIG. 1 is a block diagram illustrating a network, which is useful in explaining an illustrative embodiment of the principles of the present invention.

Referring to FIG. 1, each of a plurality of customer sites 110-1 through 110-N is coupled over a respective access line 120-1 through 120-N (note that, although N is shown to be eight in FIG. 1, same is for purposes of illustration and not by way of limitation since N can be a design parameter, which can be any integer greater than one) to a respective digital access and cross-connect system (DACS) such as DACS 130-1 through DACS 130-M (note that, although M is shown to be four in FIG. 1, same is for purposes of illustration and not by way of limitation since M can be a design parameter, which can be any integer greater than zero). DACS equipment such as the publicly used Digital Access and Cross-Connect System is commercially available from American Telephone and Telegraph Company. Various features for a DACS including a Digital Multipoint Bridge (DMB) and Optical Fiber Link Interface are also commercially available and in public use.

In my example, customer site 110-1 is coupled to DACS 130-1 by way of access line 120-1; customer sites 110-2 and 110-3 are coupled to DACS 130-2 by way of access lines 120-2 and 120-3, respectively; customer sites 110-4, 110-5, and 110-6 are coupled to DACS 130-3 by way of access lines 120-4, 120-5, and 120-6, respectively; and customer sites 110-7 and 110-8 are coupled to DACS 130-4 by way of access lines 120-7 and 120-8, respectively. Also, the respective DACS are coupled to each other by way of an ordered bus communications network arrangement. For example, DACS 130-1 is coupled to DACS 130-2 by way of first internodal link 140-1 and DACS 130-2 is coupled to DACS 130-3 by way of second internodal link 140-2 and DACS 130-3 is coupled to DACS 130-4 by way of third internodal link 140-3.

Each access line 120-i and each internodal link 140-j can include one or more communications paths and each communications path has some predetermined bandwidth and the bandwidth of one communications path may be, but need not be, the same as the bandwidth of another communications path and each communications path can be a transmission facility, (a) which may directly connect, for example, a customer site 110-i and a DACS 130-k or may directly connect one DACS with another DACS, for example, DACS 130-1 with DACS 130-2 or (b) which may indirectly connect, for example, a customer site 110-i and a DACS 130-k or may indirectly connect one DACS with another DACS, for example, DACS 130-1 with DACS 130-3 through interposed equipment or facilities, which interposed equipment or facilities could include even another DACS like DACS 130-2 interposed between DACS 130-1 and DACS 130-3.

It is now useful to distinguish between the term "bus" and the term "internodal link." On the one hand, the term internodal link refers to the connection between two DACS, e.g., in FIG. 1, internodal links 140-j, which may directly connect, for example, one DACS 130-k with another DACS 130-m or which may indirectly connect, for example, the two DACS through interposed equipment or facilities like another DACS. On the other hand, the term bus refers to an ordered set of internodal links, which connects a set of DACS in a specific ordered configuration like that shown in FIG. 1. As a further aid in distinguishing the terms, consider the following example. Each DACS 130-k can be connected to one or more other DACS like DACS 130-m by a respective internodal link 140-j. Further, when all the DACS in the network are completely interconnected, it is clear that there could be many ordered sets of internodal links. Each ordered set of internodal links that satisfies a predetermined criteria is called a bus. I have shown only one bus arrangement in FIG. 1, i.e. internodal link 140-1 coupling DACS 130-1 with DACS 130-2 then internodal link 140-2 coupling DACS 130-2 with DACS 130-3 then internodal link 140-3 coupling DACS 130-3 with DACS 130-4, which results in the ordered set of internodal links (140-1, 140-2, 140-3), which is a bus. In the trivial case where there is only a single DACS, there could be a single bus within the single DACS and there need not be any internodal links.

In general, it is desired that the resources of a network be allocated in some timely manner such that equipment at one customer site can communicate with one or more units of equipment at one or more other customer sites. The term "broadcasting" is often applied to an arrangement wherein equipment at one customer site communicates in a substantially simultaneous manner with one or more units of equipment at one or more other customer sites. Hence, broadcasting is concerned as to the signal source. The term "conferencing" is applied to an arrangement, which, without regard to signal source, involves communication among two or more units of equipment whereby a set of customer sites communicate among each other.

In accord with one aspect of the principles of my invention, an allocation methodology is set forth by way of which it is possible to allocate the limited or constrained resources of a network such as the bandwidth of a communications path in the network among a plurality of customer demands for that bandwidth and, importantly, to do the allocation in a manner such that the expectations of the customer are satisfied.

Assume that a customer or source of a demand at customer site 110-3 places a demand on a network that a video conferencing connection be set up between customer site 110-3 and all of the other customer sites 110-i shown in FIG. 1. The customer typically would have several other demands. For example, the customer may demand that the conference begin at a specific time of a day, called a start_time-date, and that the conference terminate at a specific time of the same, or of a different, day, called a stop_time-date. Further, the customer may demand that the communication paths, which are to be allocated, have some minimum bandwidth, which may be subject to a constraint such as the constraint that the network will not allocate bandwidth beyond some predetermined maximum bandwidth. Still further, the customer may, before the conference begins or during the time interval of the conference, demand the flexibility to have certain customer sites dynamically added to, or terminated from, the conference during the time interval of the conference and, still even further, these added or terminated demands may be made with relatively short lead-time and may be made either before or during a conference call. The customer may further demand that the time to start or stop the conference be changed or that the minimum bandwidth of the conference be changed. In addition to the above, there may be still other customer demands and there may be still other constraints on those demands.

Those are some of the problems, which are solved in accordance with the principles of my invention. To illustrate those principles, we will shortly describe a procedure, which may be used to generate the bindings for a reservation. But before the procedure is described, some additional terms will need definition. The term "reservation" refers to a set of demands by a customer such as the set of demands described in the immediately preceding paragraph. The term "binding" refers to the concept represented by a four-tuple of the form (X1, X2, X3, X4) where X1 is a first specific position within the bandwidth of a communications path; X2, which for our description is assumed to be larger than X1, is a second specific position within the bandwidth of the communications path; X3 is the time-date that the customer wants the conference to be setup; and X4 is the time-date that the customer wants the conference to terminate. Note that the difference between X2 and X1, i.e. X2−X1, corresponds to the minimum bandwidth that the the customer demands, which itself is subject to the constraint that the minimum bandwidth demanded may not exceed the maximum bandwidth of the communications path, which serves the reservation.

To better understand one meaning of first position X1 and one meaning of second position X2 consider a well known digital transmission network, which includes channelized bandwidth. For example, it is known that a digital network may include 24 channels (called DS0 channels, each DS0 channel operating nominally at about 64 kilobits per second) in a single multichannel communications path (called a DS1 channel, which operates nominally at about 1.544 megabits per second). In turn, it is known that 28 DS1 channels may be included in a single multichannel communications path (called a DS3 channel, which operates nominally at about 44.7 megabits per second), etc. Now, first position X1 may be a specific one of the 24 DS0 channels while second position X2, which is larger than X1, may be a specific other one of the 24 DS0 channels.

To better understand the setup-time-date X3 and the terminate-time-date X4, note that X3 and X4 could be respectively some time-date before and some time-date after the actual start-time and actual stop_time demanded by the customer, e.g., the value of X3 in the four-tuple could be less than the actual start-time-date demanded by the customer so as to allow the network adequate to set up a connection, hence X3 is also called the setup_time-date, and may be shortened to setup_time. Accordingly, setup_time X3 is a time-date such that the conference connection, if its connection commences before the start_time, will satisfy the expectations of the customer. The difference between the setup_time-date and the start_time-date is now described. The time to allow the network to setup a conference connection is called the "res_setup_time_delta." While the time to allow the network to add an endpoint to an in-progress conference is called the "room_setup_time_delta." The res_setup_time_delta and room_setup_time_delta may have different values depending on the constraints of the network, but are assumed to be zero or greater.

Similarly, the value X4 in the four-tuple could be a time-date, which is greater than the actual stop_time-date demanded by the customer, so as to allow the network adequate time to disconnect, or tear-down, the connection, hence X4 is also called the terminate_time-date, and may be shortened to terminate_time. Accordingly, terminate_time X4 is a time-date such that the conference connection, if disconnected no later that time X4 but certainly no sooner than the actual stop_time-date demanded by the customer, will satisfy the expectations of the customer. The difference between the terminate_time-date and the stop_time-date is now described. The time to allow the network to terminate a conference connection is called the "res_teardown_time_delta." While the time to allow the network to terminate an endpoint in an in-progress conference is called the "room_terminate_time_delta." The res_teardown_time_delta and room_terminate_time_delta may have different values depending on the constraints of the network, but are assumed to be zero or greater.

Finally, the plural of the term binding, i.e. the term "bindings", means the one or more binding that satisfies the customer's demand.

Figure 2:
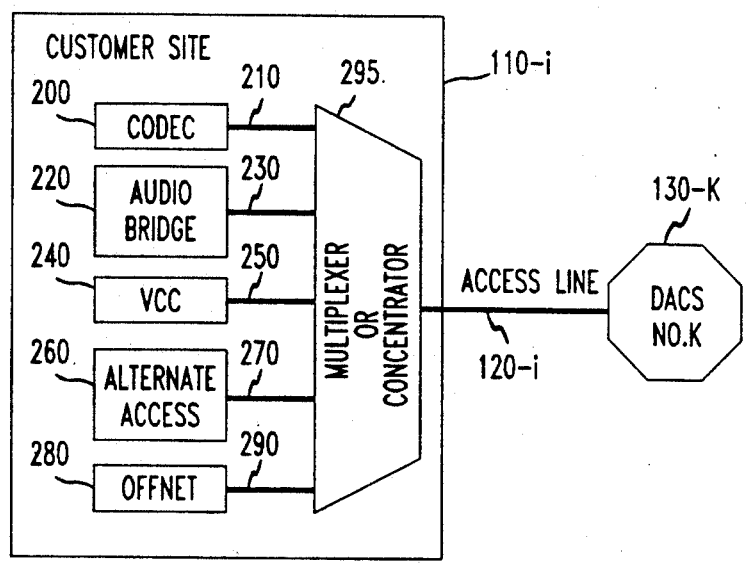
FIG. 2 illustrates a customer site, which is also useful in explaining an illustrative embodiment of the principles of the present invention.

It is now useful to describe more specifically a customer site 110-i. Typically, a customer site includes one or more units of equipment. Each unit of equipment at a customer site is called an endpoint. Further, there may be various kinds of endpoints, e.g. endpoints of a first kind, endpoints of a second kind, etc. To exemplify this concept, the ensuing description will consider five kinds of endpoints, called respectively, a codec (for coder/decoder) endpoint, an audio bridge endpoint, a video control console (VCC) endpoint, an alternate access endpoint, and an offnet (for off network) endpoint. A codec like codec 200 in FIG. 2 is a unit of equipment on a customer's site, one form of which could encode a video signal from a source for transmission to a sink where the encoded signal could be decoded, for example, to its original form. An audio bridge like audio bridge 220 in FIG. 2 is a unit of equipment on a customer's site, one form of which could be an arrangement, which mixes audio signals from a plurality of sources into a single signal that is to be extended to one or more other audio bridges. A VCC like 240 in FIG. 2 is an example of yet another specific unit of equipment, or endpoint, located on a customer's site, one form of which could include capabilities that permit a customer site to originate a video conference, to communicate with a plurality of other customer sites, e.g. to function as a "broadcaster" of information to many sites at one time, place a reservation request, or to perform other control functions. Generally, for purposes of this description, on the one hand, an alternate access like alternate access 260 in FIG. 2 is the term to describe any unit of equipment, other than a codec, audio bridge or VCC, which functions as an endpoint and is located on a customer's site. On the other hand, an offnet like offnet 280 in FIG. 2, although not necessarily a unit of equipment, can be thought of as a quasi-unit of equipment, and, as will be made more clear, is considered as a unit of equipment for our purposes. Indeed, an offnet could be a service rather than a product. For example, an offnet could be a member of the Accunet (R) family of digital services, which is a commercially available service. More generally, an offnet, which is a short-hand form of the words off network, refers to a signal processing arrangement, a signal transport arrangement, or any other arrangement, which may or may not be on the customer's site but which extends a signal to the instant network for purposes such as interconnecting the offnet provided signal to one or more endpoints within the instant network. A distinction between an offnet and an alternate access is that an alternate access would be a unit of equipment (other than a codec, audio bridge or VCC) on a customer's site while an offnet would be any arrangement other than a unit of equipment on the customer's site.

It may be noted that a common characteristic among all the endpoints is that each endpoint will require some minimum bandwidth to communicate with another endpoint and that each endpoint is adapted to extend a signal through a network to one or more "like" endpoints and that the network has no need to "understand", e.g. no need to decode, the information content of the extended signal. Using the example of the above five kinds of endpoints; three of those kinds of endpoints, i.e. codecs, audio bridges and VCCs, are examples of "unlike" endpoints since, for example, a codec would typically not understand the information content of a signal extended from an audio bridge.

Like endpoints are endpoints, which would understand signals transmitted therebetween. For example, two endpoints having the same kind of equipment like two codecs, or two audio bridges, or two VCCs would be examples of like endpoints. In addition, a customer could demand that a signal be extended from a codec at one customer site to an alternate access or to an offnet at another customer site. In this example, the codec and the alternate access or the codec and the offnet could be like endpoints. This example assumes that some arrangement would be included in the alternate access or the offnet, which arrangement could understand the information content of the extended signal.

In contrast, unlike endpoints are endpoints, which would typically not understand signals transmitted therebetween. For example, a codec at one customer site would be an unlike endpoint with respect to an audio bridge or a VCC at another customer site.

Referring to FIG. 2 and keeping the description of FIG. 1 in mind, sample customer site 110-i is coupled over access line 120-i to DACS 130-k. Customer site 110-i can include a plurality of endpoints, each endpoint coupled over a respective communications path through a multiplexer or concentrator 295 thence coupled over access line 120-i to DACS 130-k. In my example, the endpoints include codec 200, audio bridge 220, video control console (VCC) 240, alternate access 260, and offnet 280 coupled through multiplexer or concentrator device 295 respectively by way of communications paths 210, 230, 250, 270 and 290 onto access line 120-i. Although FIG. 2 illustrates one of each of the five kinds of endpoints that were mentioned above, same is not by way of limitation, but only by way of example. A customer site may include other combinations of the shown endpoints, may include other kinds of equipment as endpoints, may include some but not all of the shown kinds of endpoints, et cetera.

Continuing, a customer may request or demand that a connection be established, i.e. that there be "connectivity", between two customer sites, which is herein referred to as a two point reservation. A twopoint reservation may reflect a customer's demand for connectivity in order to allow a single signal to be communicated between the two customer sites. Alternatively, a customer may request or demand connectivity between more than two customer sites, which is herein referred to as a multipoint reservation. A multipoint reservation may reflect a customer's demand for connectivity in order to allow a single signal to be shared among a plurality of like endpoints such as (a) connectivity to bridge a plurality of the audio bridges like audio bridge 220 located at different ones of customer sites 110-i so as to allow a first signal to be commonly shared, or broadcast, or conferenced among the connected audio bridges and/or (b) connectivity to connect a plurality of video control consoles like VCC 240 located at different ones of customer sites 110-i so as to allow a second signal to be commonly shared, or broadcast, or conferenced among the connected VCCs and/or (c) connectivity to connect a plurality of codec, alternate access, and offnet endpoints like codec 200, alternate access 260 and offnet 280 located at different ones of customer sites 110-i so as to allow a third signal to be commonly shared, or broadcast, or conferenced among the connected endpoints.

A multipoint reservation may specify the desired connectivity among two or more endpoints or contemplate a predetermined default set of connectivities. For example, the customer may demand either (a) that certain codecs be connected AND that certain audio bridges be connected AND that certain VCCs be connected or (b) that certain codecs AND that certain alternate accesses AND that certain offnets be connected AND that a predetermined set of audio bridges and VCCs be connected, which predetermined set is a function of the specific codecs, alternate accesses and offnets that were demanded to be connected by the customer.

One example of alternative (b) above is an embodiment having a codec 200 at a customer site 110-i involved in a conference in which case the predetermined set could include at least one audio bridge 220 AND at least one VCC 240 at the customer site 110-i and further result in the audio bridge 220 and the VCC 240 remaining connected to the conference for so long as the codec 200 remains connected to the conference. In this example, connectivity would remain among codec 200 and the endpoints (e.g. audio bridge 220 and VCC 240) in the predetermined set even though a connection among other codecs or other alternate accesses or other offnets at customer site 110-i has been disconnected. The connectivity among codec 200 and the endpoints in the predetermined set would remain for so long as a conference remains for codec 200 at the customer site 110-i. However, it should be noted that the endpoints in a first predetermined set for first codec 200 could also be endpoints in a second predetermined set for a second codec or other endpoint at customer site 110-i, in which case, even if the first codec 200 is disconnected from the conference, the common endpoints in the first and the second predetermined sets could remain connected by virtue of the second codec remaining or being (e.g. being added to the conference) in the conference.

Figure 5:
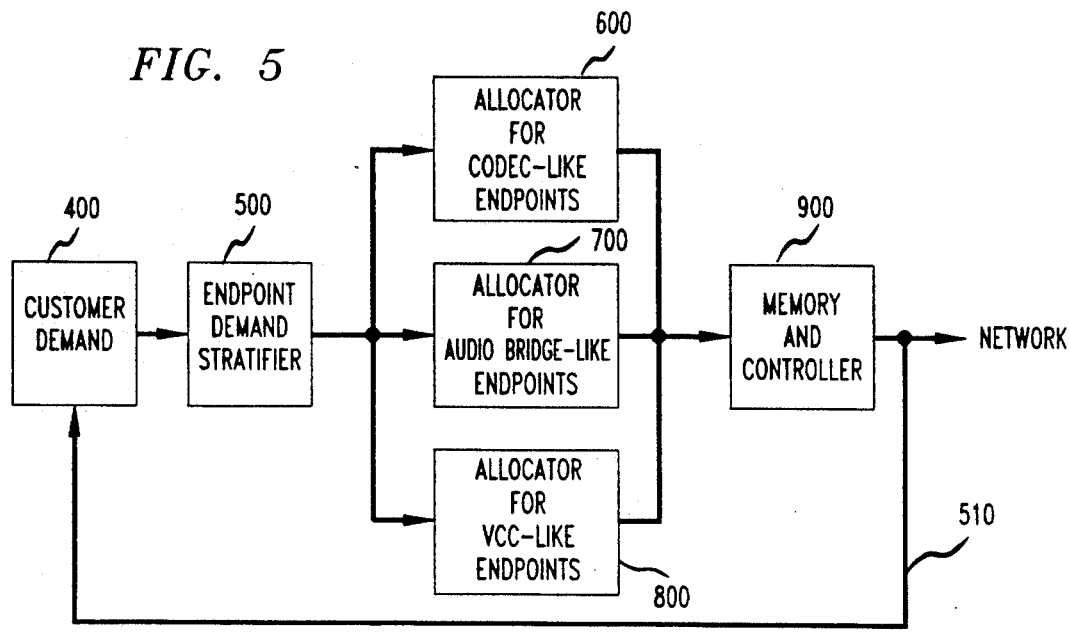
FIG. 5 illustrates my methodology for allocating a set of customer demands, which is helpful in understanding the principles of the present invention.

Referencing FIG. 5, my methodology stratifies (500) customer demand (400) by like endpoints into a plurality of sets of customer demands and then allocates (600, 700, 800) the resources of the network for each set of customer demands with like endpoints and makes the allocation information available (900) to the network for use thereby and also feedbacks (510) the allocation results to the customer. The allocation information is stored and controlled by way of memory and controller 900 for making the information available to both the network and the customer. The controller 910 provides the data requested by allocators 600, 700, and 800 to them and if all allocators are successful in allocating the reservation, the controller removes all tuples in memory associated with this reservation and places the new set of tuples associated with this reservation into the appropriate memories. If the allocators were successful in allocating the reservation, the controller 910 notifies 510 the customer demand 400 and the network of the success of the methodology and the new tuples. If the allocators were not successful in allocating the reservation, the controller 910 notifies 510 the customer demand 400.

The methodology then iterates the following actions:
1. Stratifies the customer's demands into sets of strategies for groupings of like endpoints;
2. Allocates network resources responsive to characteristics of the different groupings of like endpoints;
3. For each strategy, generates the setup_times and terminate_times for each endpoint;
4. For each strategy, reserves the endpoints for the reservation;
5. For each strategy, generates bindings;
6. For a first grouping of like endpoints such as codecs, alternate accesses, and offnets, extends a conference signal through a multiplexer or concentrator at a customer site over an access line to a homing DACS;
7. For a second grouping of like endpoints such as audio bridges, extends a conference signal from a customer site to a central bridging DACS;
8. For a third grouping of like endpoints such as VCCs, extends a conference signal from a customer site to the network;
9. Generates a DMB sequence number for the reservation;
10. Generates cross connects in the DACS to provide connectivity of like endpoint conference signals;
11. Generates the conference signal internodal connectivity required for the first grouping of codec like endpoints; and
12. Determines if the network is not available for reconfiguration of the conference during any reconfiguration of the network.

What follows now is a description of each of these actions in further detail.

As to endpoint demand stratifier 500, endpoints of a first grouping, e.g. codecs 200, alternate accesses 260, and offnets 280, are allocated according to a first strategy 600; endpoints of a second grouping, e.g. audio bridges 220, are allocated according to a second strategy 700; endpoints of a third grouping, e.g. VCCs 240, are allocated according to a third strategy 800; etc. Each grouping of endpoints includes only like endpoints and no one grouping includes both like endpoints and unlike endpoints.

Figure 6:
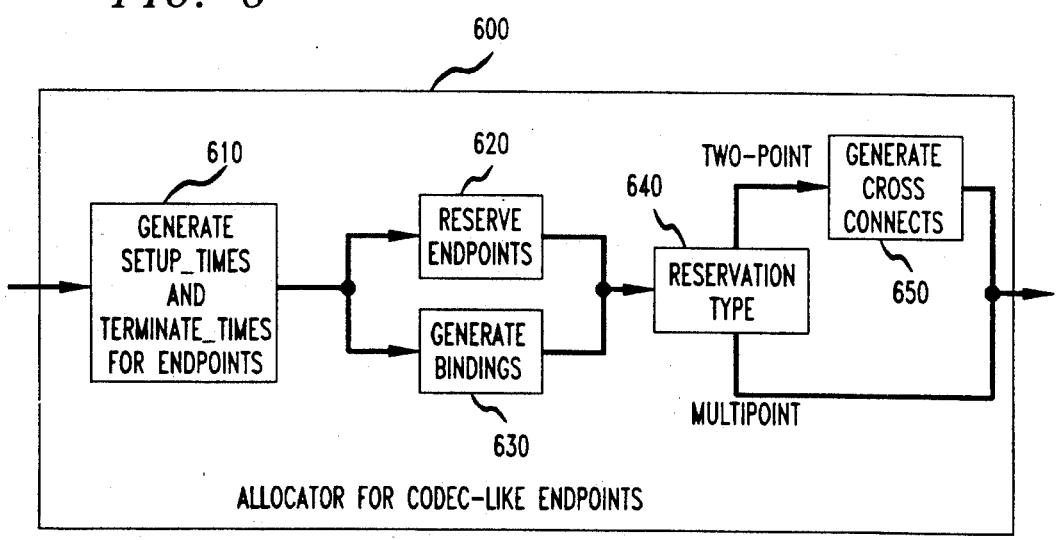
FIG. 6 illustrates an allocator process for codec-like endpoints for use in the allocator of FIG. 5, which is helpful in understanding the principles of the present invention.
Figure 7:
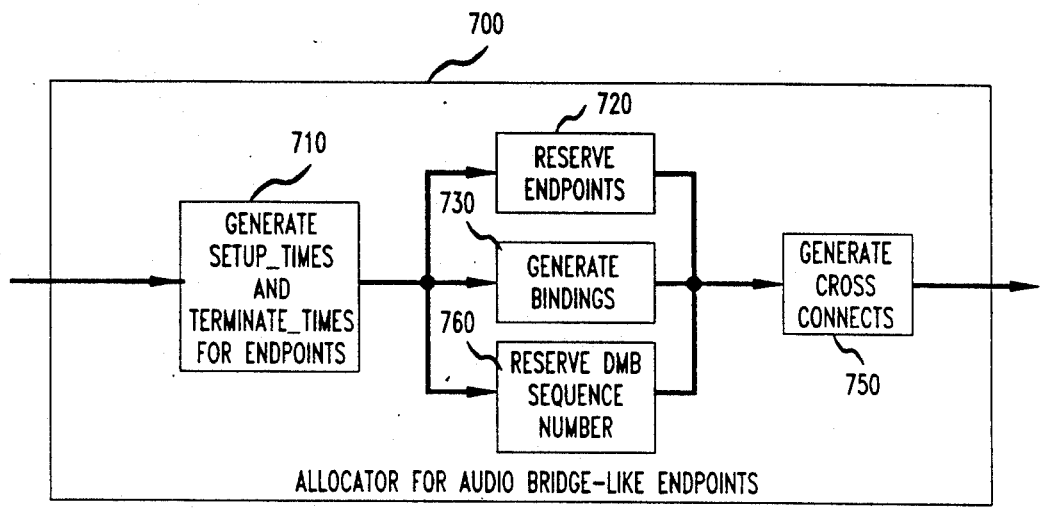
FIG. 7 illustrates an allocator process for audio bridge-like endpoints for use in the allocator of FIG. 5, which is helpful in understanding the principles of the present invention.
Figure 8:
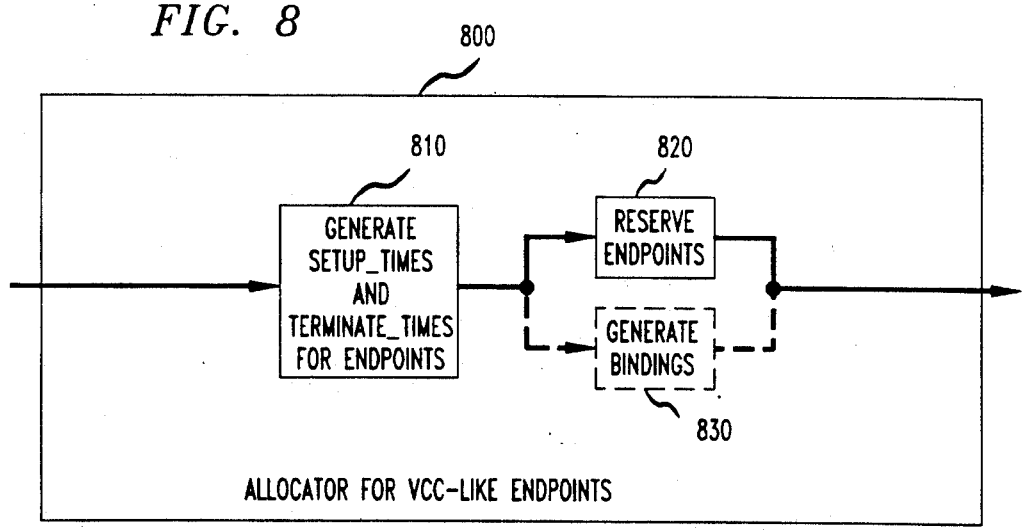
FIG. 8 illustrates an allocator process for VCC-like endpoints for use in the allocator of FIG. 5, which is helpful in understanding the principles of the present invention.

Common among each strategy are the processes of generating (610 in FIG. 6, 710 in FIG. 7, and 810 in FIG. 8), setup_times X3 and terminate_times X4 for the endpoints reserving (620 in FIG. 6, 720 in FIG. 7, and 820 in FIG. 8), the endpoints and generating (630 in FIG. 6, 730 in FIG. 7, and 830 in FIG. 8), bindings (X1, X2, X3 and X4).

Figure 3:
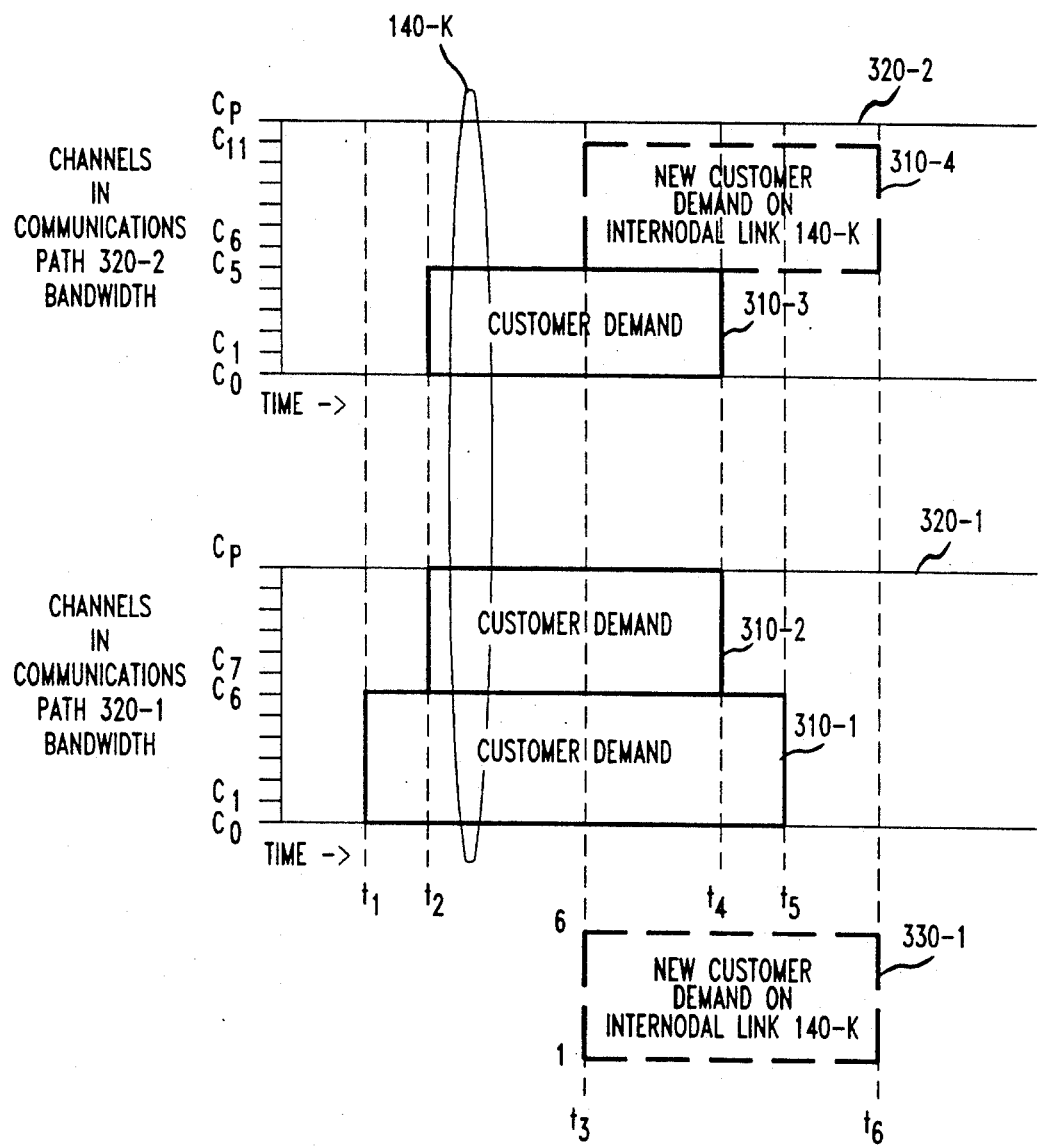
FIG. 3 illustrates a first set of customer demands, which need to be allocated to satisfy the needs of a customer and which is helpful in understanding a first example that is also useful in explaining the principles of the present invention.

Before going into the details of three such strategies, an example of a process of allocating bandwidth to a conference on an access line or on an internodal link is provided through the example shown in FIG. 3. The example is chosen so as to also focus on a process of generating bindings.

Figure 9:
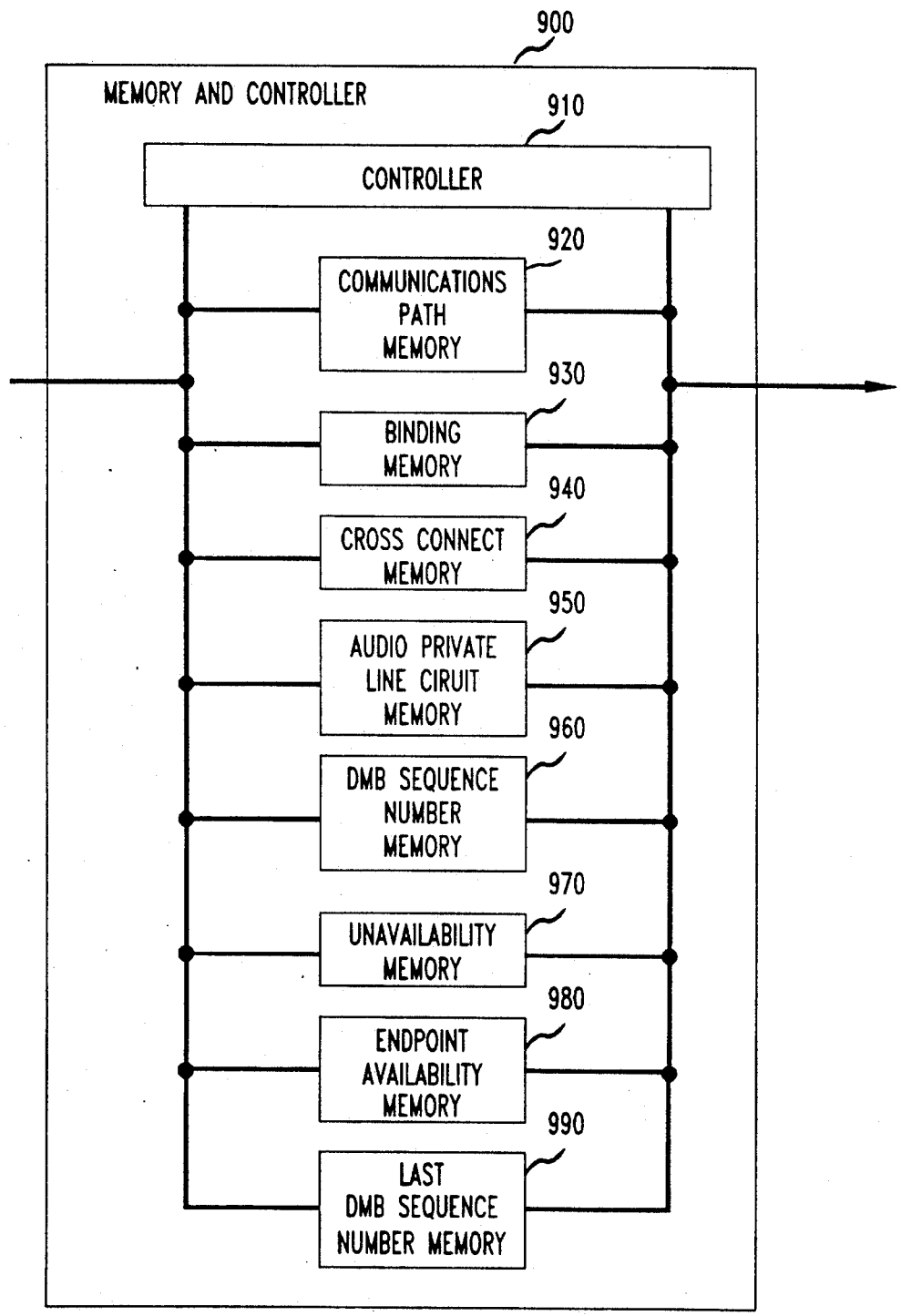
FIG. 9 illustrates memory and controller for use in the allocator of FIG. 5, which is helpful in understanding the principles of the present invention.

Referring to FIG. 3, assume that a plurality of customer demands gives rise to a corresponding plurality of bindings, which are labelled in summary form in FIG. 3 as 310-1, 310-2 and 310-3. The customer demands may be allocated to two communication paths 320-1 and 320-2 of an access line 120-i or an internodal link 140-k. Here assume the paths are part of internodal link 140-k. Customer demand 310-1 gives rise to a four-tuple binding on communications path 320-1 of internodal link 140-k. The four-tuple includes a first specific position X1 within the bandwidth of communications path 320-1 of C1; a second specific position X2 within the bandwidth of communications path 320-1 of C6; a setup_time X3 of t1; and a terminate_time X4 of t5. Customer demand 310-2 gives rise to a four-tuple binding on communications path 320-1 of internodal link 140-k. The four-tuple includes a first specific position X1 within the bandwidth of communications path 320-1 of C7; a second specific position X2 within the bandwidth of communications path 320-1 of C12 where for this example p equals 12; a setup_time X3 of t2; and a terminate_time X4 of t4. Customer demand 310-3 gives rise to a four-tuple on communications path 320-2 of internodal link 140-k. The four-tuple includes a first specific position X1 within the bandwidth of communications path 320-2 of C1; a second specific position X2 within the bandwidth of communications path 320-2 of C5; setup_time X3 of t2; and a terminate_time X4 of t4. For purposes of the example, the bindings are stored in a binding memory 930 shown in FIG. 9. Further, for the purposes of this example, assume that there are no two-tuples (X3, X4) stored in unavailability memory 970 also shown in FIG. 9. Unavailability memory 970 contains sets of two-tuples (X3, X4) where X3 and X4 have the same time definitions as for a binding. The two-tuples are stored in unavailability memory 970 and serve a function of indicating that no communication path was located as being available from the time-date beginning at setup_time X3 to and including terminate_time X4.

Assume a new customer demand 330-1 is received. A binding is needed on internodal link with a four-tuple of (X1=1, X2=6, setup_time X3=t3, terminate_time X4=t6), where (X2−X1) corresponds to the minimum bandwidth necessary to satisfy the customer demand and the setup_time and terminate_time corresponds to the time period the connectivity is required to be involved in the conference.

New demand 330-1 can be satisfied by a binding 310-4. Hence, new demand 330-1 can be satisfied as demand 310-4, which is served on communications path 320-2, which gives rise to a four-tuple binding on communications path 320-2 of internodal link 140-k. The four-tuple includes a first specific position X1 within the bandwidth of communications path 320-2 of C6; a second specific position X2 within the bandwidth of communications path 320-2 of C11; setup_time X3 of t3; and a terminate_time X4 of t6.

So much for an example of generating a binding.

As mentioned, each respective grouping of like endpoints has its respective strategy for allocating the network resources for conferencing purposes.

To illustrate a first strategy, my methodology includes an arrangement 600 for allocating network resources for conferencing a first grouping of like endpoints such as codecs, alternate accesses, and offnets. Codecs, alternate accesses, and offnets can be connected in a conference by extending a conference signal from a unit of equipment (like 220, 260 or 280) through a multiplexer or concentrator 295 over an access line 120-i to a homing DACS 130-k. Thereby, the endpoints are connected to their respective homing DACS and, further, the respective homing DACSs are connectable among themselves. Thereupon and at any time after being so connected, each unit of equipment, which has its conference signal extended over its access line to its homing DACS and whose homing DACS is so connected, is able to participate in the conference.

For purposes of identification and by way of example only, the signal to be conferenced will be referred to as the "conference signal". To establish connectivity of the conference signal, the methodology also includes the process of extending the conference signal from each endpoint in customer site 110-i, which endpoint is an endpoint for the conference being demanded by the customer, through multiplexer or concentrator 295 to an access line 120-i. That access line 120-i is called a conference signal access line and the connectivity, which is being established, is called the "conference signal access line connectivity". DACS 130-k to which the conference signal is transmitted over the conference signal access line 120-i is called the "homing DACS" for each specific endpoint in customer site 110-i, which is a participant in the conference.

To illustrate a first strategy, my methodology includes a process of generating 610 setup_times X3 and terminate_times X4 in response to the customer demanded start_time and stop_time for each endpoint in the first grouping of like endpoints.

The process of generating the setup_times and terminate_times for the endpoints (610 in FIG. 6, 710 in FIG. 7, and 810 in FIG. 8) is a two step process. The setup_time, X3, is generated on an endpoint by endpoint basis. Each endpoint that has a start_time equal to the start_time of the reservation, has a setup_time set to the start_time of the reservation less the time res_setup_time_delta, i.e., X3=start_time-res_setup_time_delta. Each endpoint that does not start at the start_time of the reservation, has the setup_time set to the start_time of the endpoint less the time room_setup_time_delta, i.e., X3=start_time-room_setup_time_delta. Note that the res_setup_time_delta may be larger than the room_setup_time_delta to allow for additional time for such actions as the time necessary for the network to verify the connectivity is correct and correctly setup for this reservation.

The terminate_time, X4, is generated on an endpoint by endpoint basis. Each endpoint that has a terminate_time equal to the terminate_time of the reservation, has a terminate_time set to the terminate_time of the reservation plus the time res_terminate_time_delta, i.e., X4=terminate_time+-res_terminate_time_delta. Each endpoint that does not terminate at the terminate_time of the reservation, has the terminate_time set to the terminate_time of the endpoint plus the time room_terminate_time_delta, i.e., X4=terminate_time+-room_terminate_time_delta. Note that the res_terminate_time_delta may be larger than the room_terminate_time_delta to allow for additional time for such actions, for example, as the time necessary to verify the network has disconnected the conference and preventative maintenance has occurred.

The endpoints are then reserved 620 for the conference and the bindings may be concurrently generated 630 in a manner similar to that described for the example in FIG. 3. We now describe the process of reserving endpoints (620 in FIG. 6, 720 in FIG. 7, and 820 in FIG. 8). The process of reserving endpoints uses the endpoint availability memory 980. The endpoint availability memory 980 stores a two-tuple (X3, X4) where X3 and X4 have the same definitions as in bindings, for an endpoint which indicates that the endpoint is not available for the time period beginning at X3 and terminating at X4. Given a setup_time and terminate_time of the endpoint which would satisfy the customers demand, my methodology searches the endpoint availability memory for any two-tuple (X3-i, X4-i) where the following conditions (a) X3-i is less than X4 (b) X3 is less than X4-i are true. If any two-tuple is found that matches the above conditions, the endpoint is considered unavailable (e.g., because it is involved in another conference) and the customer demand can not be satisfied. If no two-tuple is found, my methodology generates, but does not store, a two-tuple (X3, X4) for the endpoint into the endpoint availability memory 980.

The bindings are generated 630 in a manner similar to that described for the example in FIG. 3. The binding arrangement assumes an ordered bus configuration that allows one to find a signal to be conferenced from among the customer's demands.

My methodology then iterates the above to find the connectivity required to connect all of the endpoints in the first grouping of like endpoints, which are at each of the other customer sites 110-j, which are to be participants in the conference, to their respective homing DACS 130-m so as to meet the customer's demand.

My methodology thereafter generates the identity of all of the homing DACSs and, responsive to a predefined set of buses, generates a set of buses, which interconnect all of the homing DACSs. Responsive to the set of generated homing DACS buses, my methodology generates a set of bindings to interconnect the homing DACSs during the time interval (a) that each respective homing DACS has at least one endpoint participating in the conference or (b) that each respective homing DACS, independent of having an endpoint participating in the conference for the entirety of the conference (i.e., note that a DACS can be a homing DACS until all endpoints at all customer sites for which it is the homing DACS are disconnected from the conference. Thereupon, it looses its status as a homing DACS. However, it may continue its status as a DACS, which is an element of an internodal link between other DACSs, which others DACS continue their status as homing DACs), is a DACS, which is an element of an internodal link that is a bus for the conference. This connectivity is called the "conference signal internodal connectivity". Based on the location of the endpoints needing connectivity in a reservation, conference signal internodal connectivity may or may not be required. For example, if codec 200 at customer site 110-2 and codec 200 at customer site 110-3 are involved in a conference, no internodal links are required to connect the homing DACS, since both codecs have the same homing DACS, namely DACS 130-2, involved in the conference.

My methodology then operates in response to whether the reservation type 640 is a two point reservation or a multipoint reservation. For a two point reservation, it is necessary to generate cross connects (650) in response to which the conference signal access line connectivity of one endpoint may be cross connected to both the conference signal internodal connectivity (if any) and the conference signal access line connectivity of the other endpoint.

To generate the DACS cross connects 650 for a two point reservation, my methodology searches the set of generated bindings and matches those bindings that have communications paths that are coupled to the same unit of equipment. By way of example and referring to FIG. 1, a communications path on access line 120-1 and a communications path on internodal link 140-2 terminate on the same unit of equipment and are involved in the conference for the same period of time. For those bindings that have communications paths that terminate on the same unit of equipment, my methodology generates a six-tuple (X1-1, X2-1, X1-2, X2-2, X3, X4) where (X1-1) and (X2-1) are respectively the X1 and X2 of one binding, X1-2 and X2-2 are respectively, the X1 and X2 of another binding, X3 and X4 are the X3 and X4 of one of the two bindings (since they have the same X3 and X4), which will be stored in cross connect memory 940. It should be noted that each binding on an access line will be involved in generating one DACS cross connect and a binding on an internodal link will be involved in generating two DACS cross connects, one for each DACS that it is connected to it. It should also be noted that if the set of generated bindings does not use an internodal link, that the bindings on the two communications paths on the access lines will be cross connected.

On the other hand, for a multipoint reservation, because of the binding arrangement for conferencing endpoints of the first grouping of like endpoints, which in this example are codecs, alternate accesses, and offnets, the methodology does not need to determine DACS cross connects. Rather, the cross-connect would be accomplished as a routine function of a standard DACS.

To illustrate a second strategy, my methodology includes an arrangement 700 for allocating network resources for conferencing a second grouping of like endpoints such as for conferencing audio bridges. Audio bridges can be connected in a conference by extending the conference signal from an audio bridge 220 to a central bridging DACS. The conference signals from all the audio bridges and like endpoints participating in the conference can be connected through a DMB located at the central bridging DACS. The DMB provides a mixing function of all audio signals connected to a DMB sequence number so that each audio signal extended to the DMB sequence number is able to receive the mixed audio signal from all the other extended audio signals that are connected to the DMB sequence number and, hence to the conference.

At this juncture, some additional definitions are needed.

The term "channel_group" refers to the concept represented by a two-tuple of the form (X1, X2) where X1 and X2 have the same bandwidth definitions as for a binding. Therefore, a channel_group represents a subset of the bandwidth of a communications path. A "circuit" is then a set of channel_groups that define one connectivity arrangement between two units of equipment where the units of equipment could be endpoints or other than endpoints, for example, the units of equipment could be DACS switches or, for that matter, any units of equipment and where the units of equipment could have other units of equipment interposed therebetween.

The term "schedulable circuit" refers to a circuit, which has the characteristic that it (i.e., the circuit) is available to be reserved for use to meet a specific customer demand for a specific conference. A schedulable circuit could be marked with a flag to indicate that it is reserved for a specific conference and it is unavailable for a different conference during the time interval of the specific conference and, of some significance, it is included in a set of bindings, which would meet the customer's demand. When a schedulable circuit is included in a set of bindings, the schedulable circuit is said to be "reserved" for the time interval defined in the bindings, i.e., from setup_time X3 to terminate_time X4, using the set of channel_groups (X1, X2) defined in the circuit. One example of a schedulable circuit is an audio private line circuit between an audio bridge 220 at a customer site 110-i and a central bridging DACS.

The term "central bridging DACS" refers to any of the DACS 130-k in the network, which DACS includes a standard digital multipoint bridge (DMB) for merging or mixing a plurality of audio signals whereby each audio bridge 220 at each customer site 110-i, which is participating in the conference, has coupled to it the plurality of audio signals. It should also be noted that there may be more than one central bridging DACS in the network.

Continuing with my description and by way of example, the audio bridge signal, which is also the conference signal, from each audio bridge like endpoint can be extended to the central bridging DACS via one of two mechanisms.

The first mechanism allows allocator methodology 700 to generate 730 a set of bindings over the access line and internodal links to provide a connection to the central bridging DACS. The second mechanism uses a "schedulable" audio private line. My allocator methodology provides the flexibility to allow the customer demand to be satisfied using either mechanism.

To illustrate the first mechanism where the methodology determines a set of bindings, my methodology includes a binding arrangement for generating bindings, which assumes an ordered bus configuration that allows one to find a signal to be conferenced from among the customer's demands. To establish connectivity of the conference signal, the methodology includes the process of extending the conference signal from each endpoint at customer site 110-i, which endpoint is an endpoint like an audio bridge endpoint for the conference being demanded by the customer, through multiplexer or concentrator 295 over an access line 120-i to its homing DACS.

To illustrate the second mechanism where the audio bridge signal to be extended to the central bridging DACS utilizes an audio private line circuit, my methodology includes a binding arrangement for reserving the audio bridge's audio private line circuit. To establish connectivity of the conference signal, the methodology includes the process of extending the conference signal from each endpoint at customer site 110-i which endpoint is an audio bridge like endpoint for the conference being demanded by the customer to the central bridging DACS. This process reserves the audio private line circuit, which is retrieved from the audio private line circuit memory 950 and which provides connectivity from the endpoint at customer site 110-i to the central bridging DACS for the period of time the endpoint is involved in the conference.

My methodology iterates the above for each endpoint, which endpoint is an audio bridge like endpoint for the conference being demanded by the customer, based on the mechanism each endpoint utilizes to connect to the central bridging DACS, to find the connectivity required to connect all of the audio bridge like endpoints in each of the other customer sites 110-j, which are to be participants in the conference, to their respective central bridging DACS so as to meet the customer's demand.

This process includes scheduling the schedulable circuits, scheduling or reserving 760 a DMB sequence number, and generating 750 the required DACS cross connects. The circuit may or may not be a communications path on the access line or through the bus configuration.

My methodology also reserves a DMB sequence number 760 for the conference. The DMB sequence number to be used is determined by cycling through all possible DMB sequence numbers available on each DMB. My methodology generates a four-tuple (X3, X4, X5, X6), where X3 and X4 are the same as defined for a binding, where X5 is the identity of the specific DMB, which contains the DMB sequence number to be used, and where and X6 is the DMB sequence number to be used for reserving the DMB sequence number used by the audio bridges in a reservation. A DMB sequence number X5 can be used to serve one reservation but cannot be used to serve two reservations at the same time.

The methodology attempts to find the DMB sequence number using two sets of times. If the first set of times to be used is not able to reserve a DMB sequence number, the second set of times is used. The first set of times places an incremental time called buffer_time around the demanded setup_time X3 and terminate_time X4 to allow possible customer demands such as a demand for an extension of the reservation once it is up. The second set of times uses the setup_time X3 and terminate_time X4 without the buffer_time included. The first set of times used are the setup_time and terminate_time with a buffer of res_buffer_time subtracted or added to each time. The second set of times used are the actual setup_time and terminate_time.

The methodology determines a DMB sequence number for a reservation. Determining the DMB sequence number to be reserved can be done using any of several alternatives. For example and not by way of limitation, the methodology could use the first DMB sequence number which has not previously been used OR the methodology could use the DMB sequence number which has the greatest time interval between other conferences that will be served by the DMB sequence number OR the methodology could cycle through the set of DMB sequence numbers for each reservation ignoring any DMB sequence numbers which are serving other conferences during the time of the reservation OR the methodology could cycle through the set of DMB sequence numbers on a daily basis for each reservation in that day ignoring any DMB sequence numbers which are serving other conferences during the time of the reservation.

As one example and to show one alternative by way of which a DMB sequence number can be reserved, we will now describe the procedure where the methodology cycles through the set of DMB sequence numbers on a daily basis for each reservation in that day ignoring any DMB sequence numbers which are serving other conferences during the time of the reservation. The methodology of reserving a DMB sequence number will use the last DMB sequence number memory 990 in which is stored three-tuple (X8, X9, X10) where X8 is the DMB that contains DMB sequence number X9 is the last DMB sequence number cycled through for the day specified by X10, and X10 is the date imbedded in the setup_time X3 of the reservations which will use this three-tuple. The methodology retrieves the set of three-tuples from the last DMB sequence number memory where the X10 is the day of the setup_time of the reservation. Chosing the first tuple, the methodology increments the X9 by one. The process of incrementing X9 by one may cause the value of X9 to be reset to the first DMB sequence number available in DMB X8 if X9 is greater than the number of DMB sequence numbers maintained by the DMB X8. The methodology then searches the DMB sequence number memory 960 for any four-tuples (X3-i, X4-i, X5-i, X6-i) that following conditions (a) X5-i=X8, (b) X6-i=X9, (c) X3-i is less than X4+buffer_time, (d) X3-buffer_time is less than X4-i are true. If any tuples are retrieved from memory, the methodology increments X9 and iterates the above search. If no tuples are retrieved from memory, the methodology generates a four-tuple (X3, X4, X8, X9) and replaces the tuple retrieved from the last_DMB_sequence_number memory 990 with the three-tuple (X8, X9, X10) where the value of X9 contains the newly incremented value of X9. It should be noted that the DMB that this DMB sequence number is associated with may have a maximum number of audio bridges that may be connected to the DMB. If this is the case, the methodology would also need to search the endpoint memory to determine all the audio bridges which are using the DMB at each given moment of time and whether or not this maximum number of audio bridges limit has been reached. If the limit has been reached, the methodology would not generate a tuple and would continue. Further, if the maximum number of audio bridges being served by the network are are less than this limit, the methodology does not need to perform this additional check. The methodology continues to iterate the above until either a tuple is generated or the value of X9 is equal to the old value of X9 which was retrieved from the last DMB sequence number memory 990. If a tuple was generated the methodology is finished reserving a DMB sequence number for the reservation. If the tuple was not generated, the methodology continues. It should be noted, that the methodology must search the DMB sequence number for tuples even if the value of X9 has not be cycled (reset to the first DMB sequence number available on the DMB) because the DMB sequence number may be serving another conference that has a setup_time earlier than the day of the setup_time of the reservation currently being reserved.

The methodology iterates the above by selecting the next three-tuple (X8, X9, X10) from the set of tuples retrieved from last DMB sequence number memory. If no tuple was generated, the methodology repeats the above process with the change that the buffer_time is set to zero for purposes of the search.

If the conference is in-progress, the methodology searches the DMB sequence number memory for any tuples that the following conditions (a) X3-i is less than X4, (b) X3 is less than X4-i, (c) X5-i=X5, (d) X6-i=X6 are true. If tuples are retrieved from memory, the customer demand is denied. If no tuples are retrieved, the methodology modifies the X4 of the old reservation of the DMB sequence number for this reservation with the new value of the X4. The methodology may simply update the value of X4 if the new value of X4 is less than the old value of X4 reserved in the DMB sequence number memory. It should be noted, that because the conference is in-progress, the methodology uses the same DMB sequence number that is currently being served by the conference. By way of example, the methodology could determine a new DMB sequence number for the conference.

To illustrate a third strategy, my methodology includes an arrangement for conferencing like endpoints such as a third grouping of like endpoints including VCCs. VCCs can be conferenced by a first mechanism of extending a conference signal to the network by direct distance dialing (DDD) or by a second mechanism of extending the conference signal through the multiplexer or concentrator over the access line to the homing DACS. My binding methodology provides the flexibility to allow the customer demand to be satisfied using either mechanism.

To illustrate the first mechanism where the conference signal is extended to the network by DDD, my methodology includes an arrangement which assumes a public switched network (PSN) to find a signal to be conferenced from among the customer's demands. The connectivity for a VCC 240 in a customer site 110-i with another VCC requires that each VCC be available during the time that it is needed for the conferencing. The direct distance dialing will use a public switched network which is assumed to always allow the VCCs to connect to the network unless the direct distance dialing is not available, for example, due to a failure of its network.

To illustrate the second mechanism where the conference signal is extended to the network over the access line, my methodology includes a binding arrangement 830 for conferencing the VCCs. To establish connectivity of the conference signal, the binding methodology includes the process of extending the conference signal from each endpoint in customer site 110-i, which endpoint is an endpoint for the conference being demanded by the customer, through multiplexer or concentrator 295 to an access line 120-i. The connectivity from the endpoint over the access line to the homing DACS satisfies the customer's demand. Further, the methodology could be constrained to place the VCC signal on a specific bandwidth position within the communications path.

My binding methodology iterates the above for each endpoint, which endpoint is a VCC like endpoint for the conference being demanded by the customer, based on the mechanism each endpoint utilizes to connect to the network, to find the connectivity required to connect all of the VCC like endpoints in each of the other customer sites 110-j, which are to be participants in the conference to the network so as to meet the customer's demands.

On the one hand, bindings for a future conference call may result in a new set of bindings in which all the elements Xi may change. This is true because all the old bindings have a setup_time X3 greater than (i.e. in a temporal sense later than) the current_time. On the other hand, bindings for an in-progress conference call are generated using bindings, which are retrieved from the bindings memory. This is because all active bindings of an in-progress conference must maintain the same X1 and X2 and X3 elements during the conference, i.e. only the terminate_time X4 may change.

Note that, for an in-progress conference, setup_time X3 is less than (i.e. in a temporal sense earlier than) the current_time whereas terminate_time X4 of both the active bindings and the new bindings is greater than the current_time. Note also that some changes to an in-progress conference may result in a new set of bindings in which all elements Xi may change. This is true for those old bindings having a setup_time X3 greater than the current_time. Also, this is because the new set of bindings will have a setup_time X3, which is greater than the current_time, meaning that the changes to an existing conference will occur in the future.

If a conference is currently in-progress when a new demand is received for any bindings that have the old terminate_time earlier than the current_time or any bindings that are no longer serving the conference, because they have been terminated from the conference, the binding methodology does not allow the new demand to be accepted. This is because the new demand attempts to alter a binding which no longer serves the conference. Since the binding no longer serves the conference, the binding can not be used to generate a set of new bindings, which will occur in the future for this conference.

Further, for an in-progress conference or a conference that has been terminated, once a set of new bindings is generated for the demand (some based on the old bindings), whether it is a new demand or a change to a demand, the previously stored set of bindings can be deleted from the bindings memory and the new set of bindings is substituted therefor in the bindings memory.

We now describe a procedure, which uses my methodology, to generate the needed binding whether the needed binding would be for an access line 120-i or for an internodal link 140-k. For purposes of illustration only, our example contemplates the needed binding to be for an internodal link but the methodology is broader.

The conference signal, which is in need of a binding, may be of a type, which can be classified as a "service_type." A service_type is a classification for use by the network resources when satisfying customer demands. The network resources may be dedicated resources for that type of service, shared resources for that type of service and one or more other types of services, or may be of a special quality to meet the needs of the demands of that service_type.

The methodology for finding a binding allows for a set of predetermined parameters to be used as a function of the type of link being used (access line or internodal link), as a function of the type of like endpoints being demanded by the customer, and as a function of the network constraints. The parameters can be represented as elements of a six-tuple of the form (starting_channel, stopping_channel, direction, service_type, buffer_time, minimum_bandwidth) where the starting_channel is the lowest channel within the bandwidth of the communications path that may be used in a binding, stopping_channel is the highest channel within the bandwidth of the communications path that may be used in a binding, direction is the manner the methodology should look within the starting_channel and stopping_channel to find available bandwidth, service_type indicates that only those communications paths that support the specified service_type should be considered, buffer_time is the minimum time before X3 and after X4 to use when searching for an available binding, and minimum_bandwidth is the minimum bandwidth demanded by the customer.

For purposes of example and not by way of limitation, if the procedure were provided a set of predetermined parameters where the starting_channel=C0, stopping_channel=Cp, direction=upward, service_type="a codec like endpoint signal", buffer_time=zero, and minimum bandwidth=6; the procedure could perform the following actions to generate a binding. The procedure searches each communications path on internodal link 140-k in the communications path memory 920 which allows a service to be placed on it of the type "a codec like endpoint signal." The set of communications paths retrieved from the communications path memory may be ordered by the binding methodology to increase the time that a communications path is unused between the setup_time and terminate_time of bindings and can therefore increase the likelihood of satisfying future changes to previously satisfied customer demands. By way of example and not by way of limitation, the ordering of communication paths might be such that the first communications path has the greatest time interval between when the new reservation demand is requested and when the next and previous demands on the communications path occur, the second communications path has the second greatest time interval, etc. for all the communication paths retrieved from the communications path memory.

My methodology iterates through each communications path in the above ordered list until a binding is generated.

For purposes of this example, the order generated by the binding methodology of iterating through the communications paths is first path 320-1 and second path 320-2. Other communication paths for internodal link 140-k, such as a communication path that only supports audio bridge signals are not included in the iterative process because they do not allow a binding for a signal of signal_type="a codec like endpoint signal" to be placed on the communications path.

For each communication path in the ordered list, the procedure searches for an available minimum bandwidth between the starting_channel and the stopping_channel. The procedure searches this range of stopping_channel and stopping_channel in the manner indicated by the direction element of the six-tuple. If the direction is upward, the procedure searches the range by starting at the starting_channel and stopping at the stopping_channel to find the minimum bandwidth requested. If the direction is downward, the procedure searches the range by starting at the stopping_channel and stopping at the starting_channel to find the minimum bandwidth requested. In the example and based on the direction element in the six-tuple, the procedure will search each communications path in the ordered list starting at channel C0 and stopping at channel Cp. For each channel within the range to be searched, the procedure defines a channel_range (X1, X2), where X2−X1 corresponds to the minimum_bandwidth element of the six-tuple such that X2 is not greater than the stopping_channel element in the six-tuple. In the example, the first channel_range to be defined is (X1=C0, X2=C0+6=C6) on communications path 320-1. The last channel_group to be defined on communications path 320-1 would be (X1=Cp−6=6, X2=Cp=12).

For each channel_group defined, the procedure searches the binding memory 930 for collisions of the defined channel_range with other customer demands. A "collision" is defined to occur when an existing binding in binding memory defined by the four-tuple (X1-1, X2-1, X3-1, X4-1) and a channel_group (X1, X2) and the desired setup_time X3 and desired terminate_time X4 of that channel_group have the following conditions (a) X1 is less than X2-1, (b) X1-1 is less than X2, (c) X3-buffer_time is less than X4-1, and (d) X3-1 is less than X4+buffer_time are all true. If a collision occurs, the procedure continues to iterate through the range of channels in the direction indicated by the direction element in the six-tuple. If all the channels within the specified range for a communications path have been searched, the procedure iterates through the remaining communications paths in the ordered list.

In the example of FIG. 3, demand 310-1 causes a collision for channel_ranges searched (1,6), (2,7), (3,8), (4,9), (5,10), and (6,11). Demand 310-2 causes a collision for channel_ranges searched (2,7), (3,8), (4,9), (5,10), (6,11), and (7,12). At this point in the processing of the demand, the procedure has exhausted all possible channel_ranges on communications path 320-1 and begins to attempt to generate a binding of communications path 320-2. In this example, demand 320-3 causes a collision for channel_ranges searched (1,6), (2,7), (3,8), (4,9), and (5,10). The first channel_range to not cause a collision is channel_range (6,11). Whereupon, the procedure generates a binding with a four-tuple (X1=6, X2=11, X3=t3, X4=t6).

My binding methodology iterates the above actions first with a buffer_time equal to the buffer_time element specified in the six-tuple and if unable to generate a binding, performs the same iterations again, but with the buffer_time set equal to zero, which attempts to check for collisions with the exact times desired in the binding.

Note that a first signal, which is being transmitted on a communication path for a specified time, uses a set of contiguous channels. Other signals may use other channels on that communication path at the same time provided they do not overlap channels of the first signal.

The communication path must also be available during the time requested. The binding methodology searches a unavailability memory 970 (which can be suitably generated and stored in software), to determine if the communication path is not available during the desired time beginning at time-date X3 and terminating at time-date X4.

Binding signals on the access line communication paths can be limited by the binding methodology to a particular range of channels to be searched and a direction of the search which is different from the limitations on the range of channels to be searched and the direction of the search for internodal link, or for that manner, access lines which connect a DACS 140-k to a set of offnet endpoints, to find the necessary bindings. For example, the communication paths on an access line 120-i may be limited by the binding methodology to searching channels from Cm to Cp-n in the downward direction, where Cm is some predetermined channel on that access line and n is some predetermined integer value equal to or greater than zero. Whereas, the communication paths on an internodal link 140-j may be limited by the binding methodology to searching channel from C0 to Cp in the upward direction.

We now describe a procedure, which uses my methodology, to generate the needed information for passing a signal from an endpoint at a customer site 110-i through the multiplexer or concentrator 295 at customer site 110-i. This process is called generating a cross connect for the multiplexer or concentrator 295 at customer site 110-i. For purposes of illustration only, a signal is needed from endpoint 200 at customer site 110-i to pass through multiplexer or concentrator 295 at customer site 110-i. The cross connect that my methodology establishes is a five-tuple (X7, X1, X2, X3, X4) where X7 is the endpoint providing the signal, X1, X2, X3, X4 are the same definitions for a binding. The X1, X2, X3 and X4 elements of the five-tuple are the same elements as the binding for this conference signal on the access line, which is called the conference signal access line connectivity. My binding methodology generates the five-tuple after the access line binding has been generated and the resulting five-tuple is stored in the cross connect memory 940.

We now describe the procedure, which uses my methodology, to extend the signal of an endpoint to the homing DACS. The procedure finds a binding for the endpoint on the access line using the predetermined parameters for that access line. The procedure then generates the cross connect for the multiplexer or concentrator 295 at customer site 110-i.

A circuit may be reserved, similar to the manner a schedulable circuit may be reserved using network resources. The distinction between a reserved circuit and a reserved schedulable circuit is that a reserved schedulable circuit reserves the circuit for a specific conference, whereas the reserved circuit does not. The reserved circuit is typically used for reserving additional circuits in the network not associated with a reservation, however, may satisfy some other customer demand not associated with any customer demand. An example of a reserved circuit that utilizes the network resources on the instant network is called a static circuit signal. When static circuit signals are allocated, these will be allocated starting at channel C0 and move up to Cm-1 in the upward direction, where Cm is the same predetermined channel on an access line as described above. The value Cm can be predetermined for each access line, or communications path on the access line, and can be suitable stored in the communications path memory 920.

Reservations are scheduled using a delta scheme. The methodology uses the bindings currently in the binding memory for the customer demand (if they exist) and determines the necessary changes to those bindings to generate new bindings. If a required binding did not change from the one in binding memory, where the two endpoints of the communications path is the same, the desired minimum bandwidth is the same, and the setup_time and terminate_time are the same, the binding methodology uses the existing binding in binding memory. If an old binding is no longer required, it is not maintained in the new set of bindings for the customer demand. If the required binding does not exist, the methodology finds a set of bindings to satisfy the customer demand and adds the new set of bindings into the set of bindings required to satisfy the reservation. If the required binding has changed from the one in the binding memory, the methodology handles these requests differently. If the change occurs for an in-progress binding (i.e., when setup_time X3 is less than current_time), the same channel_groups are used with the new times X3 and X4 as specified in the new customer demand. If the change occurs for a future binding (i.e., when setup_time X3 is greater than current_time), the old binding may be removed from the existing set of bindings to satisfy the reservation and a new binding can be determined. If, however, the old binding is not changed, the old binding would be added to the set of bindings which satisfy the reservation. If the old binding's X4 is greater than the new demand's X4 and the setup_times are the same, the binding methodology will use the old bindings except that the new demand's X4 will replace the old binding's X4 and the binding methodology will not check for collisions.

When a reservation is provided, a reservation setup_time, start_time, and stop_time will be provided with the reservation specification. If a setup_time is provided, the generated setup_times and terminate_times for end points (610, 710, 810) will use this time instead of the generated reservation setup_time.

All times that are checked within the methodology for scheduling endpoints or their associated audio or control portions will be based on the setup_time and terminate_time. The methodology attempts to find network bindings and the DMB sequence number using two sets of times. The first set of times places a buffer of time around the request to allow possible extensions of the reservation once it is up. The second set of times, uses the network actual times The first set of times used are the setup_time and terminate_time with a buffer of res_buffer_time minutes subtracted/added to each time. The second set of times used are the actual setup_time and terminate_time.

Endpoints are scheduled to ensure that they are available. This is done by checking that the endpoint has not been allocated for the time period that the endpoint is in the reservation. No time buffering occurs when scheduling the endpoints. Each endpoint in the reservation is also checked to see if it has been placed in unavailability memory 970. If the endpoint is a codec, the codec, the customer site 110-i where the codec is located, and the multiplexer or concentrator 295 at customer site 110-i are checked if they have been placed in unavailability memory 970.

Given a specific time period, a valid binding is determined by searching all the communication paths between the two desired locations. For each communication path, methodology determines what services is traveling on that communication path during the period necessary. The records found indicate channel ranges that are not usable for the desired time period. The available channel ranges are generated. The available channel ranges are then checked to satisfy the request. The channel ranges are checked based on the boundaries defined (lower and upper channel ranges) and the direction. A request is satisfied if the desired bandwidth falls within the boundary and the entire bandwidth is available.

Referring to FIG. 4, there is shown an example to illustrate a customer demand, also called a reservation, which may consist of several demands. In FIG. 4, a customer reservation may demand (i) a minimum bandwidth through the network of 12 contiguous channels of bandwidth; (ii) a conference start_time-date of 1:00 pm Jun. 15, 1990; (iii) a conference terminate_time-date of 5:00 pm Jun. 15, 1990; and (iv) a conference where the audio bridges and VCCs at the customer sites for the codecs, alternate access, or offnet endpoints exist. Further in the example, assume the following further customer demands:

(1) offnet endpoint 280 at customer site 110-1 is to participate in the conference with a setup_time-date of 2:00 pm Jun. 15, 1990 and a terminate_time-date of 4:00 pm Jun. 15, 1990;

(2) codec endpoint 200 at customer site 110-2 is to participate in the conference with a setup_time-date of 1:00 pm Jun. 15, 1990 and a terminate—time-date of 5:00 pm Jun. 15, 1990;
(3) codec endpoint 200 at customer site 110-3 is to participate in the conference with a setup—time-date of 1:00 pm Jun. 15, 1990 and a terminate—time-date of 5:00 pm Jun. 15, 1990;
(4) codec endpoint 200 at customer site 110-4 is to participate in the conference with a start—time-date of 1:00 pm Jun. 15, 1990 and a terminate—time-date of 5:00 pm Jun. 15, 1990;
(5) codec endpoint 200 at customer site 110-5 is to participate in the conference with a start—time-date of 1:00 pm Jun. 15, 1990 and a terminate—time-date of 5:00 pm Jun. 15, 1990;
(6) codec endpoint 200 at customer site 110-6 is to participate in the conference with a start—time-date of 1:00 pm Jun. 15, 1990 and a terminate—time-date of 5:00 pm Jun. 15, 1990;
(7) codec endpoint 200 at customer site 110-7 is to participate in the conference with a start—time-date of 1:00 pm Jun. 15, 1990 and a terminate—time-date of 5:00 pm Jun. 15, 1990; and
(8) codec endpoint 200 at customer site 110-8 is to participate in the conference with a start—time-date of 2:00 pm Jun. 15, 1990 and a terminate—time-date of 4:00 pm Jun. 15, 1990.

Hence, FIG. 4 recites to a set of customer demands. This set of customer demands can be stratified according to a first strategy of a set of like endpoints such as:
(1) offnet endpoint 280 at customer site 110-1 is to participate in the conference with a setup—time-date of 2:00 pm Jun. 15, 1990 and a terminate—time-date of 4:00 pm Jun. 15, 1990;
(2) codec endpoint 200 at customer site 110-2 is to participate in the conference with a setup—time-date of 1:00 pm Jun. 15, 1990 and a terminate—time-date of 5:00 pm Jun. 15, 1990;
(3) codec endpoint 200 at customer site 110-3 is to participate in the conference with a setup—time-date of 1:00 pm Jun. 15, 1990 and a terminate—time-date of 5:00 pm Jun. 15, 1990;
(4) codec endpoint 200 at customer site 110-4 is to participate in the conference with a start—time-date of 1:00 pm Jun. 15, 1990 and a terminate—time-date of 5:00 pm Jun. 15, 1990;
(5) codec endpoint 200 at customer site 110-5 is to participate in the conference with a start—time-date of 1:00 pm Jun. 15, 1990 and a terminate—time-date of 5:00 pm Jun. 15, 1990;
(6) codec endpoint 200 at customer site 110-6 is to participate in the conference with a start—time-date of 1:00 pm Jun. 15, 1990 and a terminate—time-date of 5:00 pm Jun. 15, 1990;
(7) codec endpoint 200 at customer site 110-7 is to participate in the conference with a start—time-date of 1:00 pm Jun. 15, 1990 and a terminate—time-date of 5:00 pm Jun. 15, 1990; and
(8) codec endpoint 200 at customer site 110-8 is to participate in the conference with a start—time-date of 2:00 pm Jun. 15, 1990 and a terminate—time-date of 4:00 pm Jun. 15, 1990.

This set of customer demands can be stratified according to a second strategy of a set of like endpoints such as
(1) audio bridge 220 at customer site 110-1 is to participate in the conference with a setup—time-date of 2:00 pm Jun. 15, 1990 and a terminate—time-date of 4:00 pm Jun. 15, 1990;
(2) audio bridge 220 at customer site 110-2 is to participate in the conference with a setup—time-date of 1:00 pm Jun. 15, 1990 and a terminate—time-date of 5:00 pm Jun. 15, 1990;
(3) audio bridge 220 at customer site 110-3 is to participate in the conference with a setup—time-date of 1:00 pm Jun. 15, 1990 and a terminate—time-date of 5:00 pm Jun. 15, 1990;
(4) audio bridge 220 at customer site 110-4 is to participate in the conference with a start—time-date of 1:00 pm Jun. 15, 1990 and a terminate—time-date of 5:00 pm Jun. 15, 1990;
(5) audio bridge 220 at customer site 110-5 is to participate in the conference with a start—time-date of 1:00 Jun. 15, 1990 and a terminate—time-date of 5:00 pm Jun. 15, 1990;
(6) audio bridge 220 at customer site 110-6 is to participate in the conference with a start—time-date of 1:00 pm Jun. 15, 1990 and a terminate—time-date of 5:00 pm Jun. 15, 1990;
(7) audio bridge 220118 participate in the conference with a start—time-date of 1:00 pm Jun. 15, 1990 and a terminate—time-date of 5:00 pm Jun. 15, 1990; and
(8) audio bridge 220 at customer site 110-8 is to participate in the conference with a start—time-date of 2:00 pm Jun. 15, 1990 and a terminate—time-date of 4:00 pm Jun. 15, 1990. This set of customer demands can be stratified according to a third strategy of a set of like endpoints such as
(1) VCC 240 at customer site 110-1 is to participate in the conference with a setup—time-date of 2:00 pm Jun. 15, 1990 and a terminate—time-date of 4:00 pm Jun. 15, 1990;
(2) VCC 240 at customer site 110-2 is to participate in the conference with a setup—time-date of 1:00 pm Jun. 15, 1990 and a terminate—time-date of 5:00 pm Jun. 15, 1990;
(3) VCC 240 at customer site 110-3 is to participate in the conference with a setup—time-date of 1:00 pm Jun. 15, 1990 and a terminate—time-date of 5:00 pm Jun. 15, 1990;
(4) VCC 240 at customer site 110-4 is to participate in the conference with a start—time-date of 1:00 pm Jun. 15, 1990 and a terminate—time-date of 5:00 pm Jun. 15, 1990;
(5) VCC 240 at customer site 110-5 is to participate in the conference with a start—time-date of 1:00 pm Jun. 15, 1990 and a terminate—time-date of 5:00 pm Jun. 15, 1990;
(6) VCC 240 at customer site 110-6 is to participate in the conference with a start—time-date of 1:00 pm Jun. 15, 1990 and a terminate—time-date of 5:00 pm Jun. 15, 1990;
(7) VCC 240 at customer site 110-7 is to participate in the conference with a start—time-date of 1:00 pm Jun. 15, 1990 and a terminate—time-date of 5:00 pm Jun. 15, 1990; and
(8) VCC 240 at customer site 110-8 is to participate in the conference with a start—time-date of 2:00 pm Jun. 15, 1990 and a terminate—time-date of 4:00 pm Jun. 15, 1990;

While the example of customer demand shown in FIG. 4 does not show two codecs or like endpoints participating in the same conference at one customer site, my methodology allows such a customer demand. Further and by way of example, if codec 200 at customer site 110-2 is to participate in a conference with a setup—time-date of 1:00 pm Jun. 15, 1990 and terminate—time-date of 5:00 pm Jun. 15, 1990 and alternate access 260 at customer site 110-2 is to participate in the same conference with a setup—time-date of 5:00 pm Jun. 15, 1990 and terminate—time-date of 10:00 pm Jun. 15, 1990 and audio bridge 220 at customer site 110-2 is a common unit of equipment in the predetermined set, the audio bridge 220 at customer site 110-2 will participate in the conference for the setup—time-date of 1:00 pm Jun. 15, 1990 and terminate—time-date of 10:00 pm Jun. 15, 1990. The setup—time-date X3 and terminate—time-date X4 are generated for audio bridge 220 at customer site 110-2 by using the earliest setup—time-date and the latest terminate—time-date of the set of codec like endpoints at customer site 110-2 involved in the conference such that at least one of the set of codec like endpoints is involved in the conference at any time from the earliest setup—time-date to the latest terminate time-date. In the example above, at least one of the set of codec, alternate access, and offnet at customer site 110-2 is involved in the conference room from 1:00 pm Jun. 15, 1990 until 10:00 pm Jun. 10, 1990. It may be the case that an endpoint can be involved in a conference multiple times and that the endpoints of the predetermined set for that endpoint may also be involved in a conference multiple times.

For purposes of the example, all VCC connectivity will be done using DDD as the manner of extending the VCC signal to the network.

Although my invention has been described and illustrated in detail using certain examples, it is to be understood that the same is not by way of limitation. Hence, the spirit and scope of my invention is limited only by the terms of the appended claims.

I claim:

1. A method for reserving and allocating a plurality of competing demands for an ordered bus communications network in response to a plurality of demands from a source, the network including a plurality of customer sites, each customer site including one or more endpoints, each endpoint being connectable to a switching system, the switching system being connectable to one or more other switching systems, means for connecting a first endpoint through said one or more switching systems to a second endpoint, wherein the improvement comprises the steps of:
    (a) receiving demands from a customer site for allocating the network for a communication among a plurality of customer sites;
    (b) stratifying the received demands in response to a grouping of endpoints to be conferenced at the customer sites;
    (c) allocating the network resources to connect the endpoints to be conferenced in response to the stratified demand including
      generating setup and terminate times for each endpoint to be connected in a conference;
      reserving the endpoints to be connected in the conference; and
      generating a plurality of bindings for signaling the network and the source as to success of connecting the endpoints to be conference over said ordered bus network.

2. The method defined in claim 1 further comprising the steps of:
    (d) stratifying a customer's demand into sets of strategies for groupings of like endpoints;
    (e) allocating network resources responsive to characteristics of the different groupings of like endpoints;
    (f) for each strategy, generating the setup—times and terminate—times for each endpoint;
    (g) for each strategy, reserving the endpoints for a reservation; and
    (h) for each strategy, generating bindings.

3. The method defined in claim 2 further comprising the steps of:
    (i) for a first grouping of like endpoints selected from the group consisting of codecs, alternate accesses, and offnets, extending a conference signal through a multiplexer or concentrator at a customer site over an access line to a homing DACS to which said endpoints are connected.

4. The method defined in claim 2 further comprising the step of:
    (i) for a second grouping of like endpoints including one or more audio bridges, extending a conference signal from a customer site to a central bridging DACS on which said audio bridge resides.

5. The method defined in claim 3 or 4 further comprising the step of:
    (j) generating instructions for controlling said homing DACS to provide connectivity of like endpoint conference signals.

6. The method defined in claim 3 further comprising the step of:
    (j) generating bindings for connections between said one or more switching systems required for the first grouping of codec like endpoints.

7. The method defined in claim 2 further comprising the step of:
    (i) for a third grouping of like endpoints including one or more video conference controllers, extending a conference signal from a customer site to the network.

8. The method defined in claim 2 wherein said bindings generation step (h) further comprises the steps of:
    responsive to a service—and to a bandwidth and to a start—time and to a stop—time from a source of demand, searching for one or more communication paths, which satisfy the demand;
    responsive to the demand satisfying communication paths, searching the communication paths in a predetermined direction and range of bandwidth to identify the bandwidth in the paths, which satisfy the source demand.

9. The method defined in claim 8 wherein said bindings generation step (h) further comprises the steps of:
    generating a buffer time around the start—time and the stop—time;
    responsive to the buffer time, searching for a bandwidth which does not collide with other source demands.

10. The method defined in claim 2 wherein said bindings generation step (h) further comprises the steps of:
    responsive to a delta scheme and responsive to the current—time of the demand, determining whether a new source demand can be satisfied using existing bindings, or whether new bindings need to be generated;
    responsive to the determining step, providing a set of bindings to satisfy the source demand.

11. The method defined in claim 1 further comprising the step of:

(i) determining if the network is not available for reconfiguration of a conference during any reconfiguration of the network.

12. The method defined in claim 1 wherein said bindings generation step further comprises the steps of:
responsive to a service_type and to a bandwidth and to a start_time and to a stop_time from a source of demand, searching for one or more communication paths, which satisfy the demand;
responsive to the demand satisfying communication paths, searching the communication paths in a predetermined direction and range of bandwidth to identify the bandwidth in the paths, which satisfy the source demand.

13. The method defined in claim 12 wherein said bindings generation step further comprises the steps of:
generating a buffer time around the start_time and the stop_time;
responsive to the buffer time, searching for a bandwidth which does not collide with other source demands.

14. The method defined in claim 1 wherein said bindings generation step further comprises the steps of:
responsive to a change to a previously processed demand and responsive to the current_time of the demand, determining whether a new source demand can be satisfied using existing bindings, or whether new bindings need to be generated;
responsive to the determining step, providing a set of bindings to satisfy the source demand.

15. A system for reserving and allocating a plurality of competing demands for an ordered bus communications network in response to a plurality of demands from a source, the network including a plurality of customer sites, each customer site including one or more endpoints, each endpoint being connectable to a switching system, the switching system being connectable to another switching system, means for connecting a first endpoint through one or more switching systems to a second endpoint, wherein the improvement comprises:
means for receiving demands from a customer site for allocating the network for a communication among a plurality of customer sites;
means for stratifying the received demands in response to a grouping of endpoints to be conferenced at the customer sites;
means for allocating the network resources to connect the endpoints to be conferenced in response to the stratified demand including
(i) means for generating setup and terminate times for each endpoint to be connected in a conference;
(ii) means for reserving the endpoints to be connected in the conference; and
(iii) means for generating a plurality of bindings for signalling the network and the source as to success of connecting the endpoints to be conferenced over said ordered bus network.

16. The system defined in claim 15 further comprising:
means for stratifying a customer's demand into sets of strategies for groupings of like endpoints;
means for allocating network resources responsive to characteristics of the different groupings of like endpoints;
for each strategy, means for generating the setup_times and terminate_times for each endpoint;
for each strategy, means for reserving the endpoints for a reservation; and
for each strategy, means for generating bindings.

17. The system defined in claim 16 further comprising:
for a first grouping of like endpoints selected from the group consisting of codecs, alternate accesses, and offnets, means for extending a conference signal through a multiplexer or concentrator at a customer site over an access line to a homing DACS to which said endpoints are connected.

18. The system defined in claim 16 further comprising:
for a second grouping of like endpoints including one or more audio bridges, means for extending a conference signal from a customer site to a central bridging DACS one which said audio bridge resides.

19. The system defined in claim 17 or 18 further comprising:
means for generating instructions for controlling said homing DACS to provide connectivity of like endpoint conference signals.

20. The system defined in claim 17 further comprising:
means for generating bindings for connections between said one or more switching system required for the first grouping of codec like endpoints.

21. The system defined in claim 16 further comprising:
for a third grouping of like endpoints including one or more video conference controllers, means for extending a conference signal from a customer site to the network.

22. The system defined in claim 16 wherein said last mentioned bindings generation means further comprises:
responsive to a service_type and to a bandwith and to a start_time and to a stop_time from a source of demand, means for searching for one or more communication paths, which satisfy the demand;
responsive to the demand satisfying communication paths, means for searching the communication paths in a predetermined direction and range of bandwidth to identify the bandwidth in the paths, which satisfy the source demand.

23. The system defined in claim 22 wherein said last mentioned bindings generation means further comprises:
means for generating a buffer time around the start_time and the stop_time;
responsive to the buffer time, means for searching for a bandwidth which does not collide with other source demands.

24. The system defined in claim 16 wherein said last mentioned bindings generation means further comprises:
responsive to a change to a previously processed demand and responsive to the current_time of the demand, means for determining whether a new source demand can be satisfied using existing bindings, or whether new bindings need to be generated;
responsive to the determining step, means for providing a set of bindings to satisfy the source demand.

25. The system defined in claim 15 further comprising:

means for determining if the network is not available for reconfiguration of a conference during any reconfiguration of the network.

26. The system defined in claim 15 wherein said bindings generation means further:
responsive to a service_type and to a bandwidth and to a start_time and to a stop_time from a source of demand, means for searching for one or more communication paths, which satisfy the demand;
responsive to the demand satisfying communication paths, means for searching the communication paths in a predetermined direction and range of bandwidth to identify the bandwidth in the paths, which satisfy the source demand.

27. The system defined in claim 26 wherein said bindings generation means further comprise:
means for generating a buffer time around the start_time and the stop_time;
responsive to the buffer time, means for searching for a bandwidth which does not collide with other source demands.

28. The system defined in claim 15 wherein said bindings generation means further comprises:
responsive to a delta scheme and responsive to the current_time of the demand, means for determining whether a new source demand can be satisfied using existing bindings, or whether new bindings need to be generated;
responsive to the determining step, means for providing a set of bindings to satisfy the source demand.

* * * * *